United States Patent [19]

Vali et al.

[11] Patent Number: 5,058,420
[45] Date of Patent: Oct. 22, 1991

[54] FIBER OPTIC LIQUID LEAK DETECTOR

[75] Inventors: Victor Vali, Laguna Hills; David B. Chang, Tustin; Patrick C. Brownrigg, Long Beach, all of Calif.

[73] Assignee: Hughes Aircraft Company, Los Angeles, Calif.

[21] Appl. No.: 511,618

[22] Filed: Apr. 20, 1990

[51] Int. Cl.$^5$ .................. G01M 3/38; G01F 23/28; G02B 27/12
[52] U.S. Cl. .................. 73/49.2; 73/293; 250/577
[58] Field of Search .......... 73/49.2, 293; 250/577, 250/900, 227.18

[56] References Cited

U.S. PATENT DOCUMENTS

| | | | |
|---|---|---|---|
| 4,270,049 | 5/1981 | Tanaka et al. | 250/577 X |
| 4,287,427 | 9/1981 | Scifres | 73/293 X |
| 4,443,699 | 4/1984 | Keller | 73/293 X |
| 4,644,177 | 2/1987 | Barabino | 250/577 |
| 4,689,484 | 8/1987 | McMahon | 250/577 X |
| 4,749,855 | 6/1988 | Watanabe | 250/577 X |

FOREIGN PATENT DOCUMENTS

| | | | |
|---|---|---|---|
| 2809805 | 9/1979 | Fed. Rep. of Germany | 73/293 |
| 228030 | 9/1988 | Japan | 73/293 |

Primary Examiner—Michael J. Tokar
Assistant Examiner—Joseph W. Roskos
Attorney, Agent, or Firm—Michael W. Sales; Wanda K. Denson-Low

[57] ABSTRACT

A precision liquid leak detector 10 free of mechanical moving parts is disclosed herein. The liquid leak detector 10 of the present invention is disposed to measure the rate of change of the volume of a liquid within a container 14. The leak detector 10 includes a light guide 16, implemented as an optical fiber, which is disposed within the container 14 and at least partially immersed in the liquid. The optical fiber 16 includes a fiber core circumscribed by a fiber cladding selected such that evanescent wave loss occurs as a result of immersion of the cladding within the liquid. The optical fiber 16 is positioned in optical alignment with a laser source 26, which injects optical energy therein. The leak detector 10 of the present invention further includes an arrangement 24 for measuring the decrease in the intensity of the injected optical energy occurring over a length of the fiber 16 immersed in the liquid. The measuring arrangement 24 then generates an intensity loss signal indicative of this intensity decrease. The inventive leak detector 10 also includes a network 36 and 38 for measuring the rate of change of the intensity loss signal and for calculating the rate of change of the liquid volume on the basis of the change in the intesity loss signal.

3 Claims, 2 Drawing Sheets

FIBER OPTIC LIQUID LEAK DETECTOR

BACKGROUND OF THE INVENTION

1. Field of the Invention

This invention relates to liquid leak detectors. More specifically, this invention relates to a liquid leak detector disposed to optically measure changes in the volume of liquid stored within a container.

While the present invention is described herein with reference to a particular embodiment, it is understood that the invention is not limited thereto. Those having ordinary skill in the art and access to the teachings provided herein will recognize additional embodiments within the scope thereof.

2. Description of the Related Art

Leak detectors are utilized in many applications of which underground chemical storage tanks is one example. Leak detectors are typically disposed to estimate changes in the volume of liquid held within a tank by measuring the time rate of change of the liquid level therein. One technique for measuring the time rate of change of liquid level involves monitoring the pressure change at the bottom of the tank. However, this technique is not of the requisite precision to discern the existence of certain "slow" leaks. The capability to detect such small leaks is of particular importance when monitoring tanks containing toxic liquids.

In a second technique an electro-mechanical apparatus is operative to determine the time rate of change of liquid level within the tank. A float element residing on the surface of the liquid changes the position of a contact on a resistance wire as the fuel level changes. The equivalent resistance may be periodically measured to determine the rate of change of the liquid level. Such leak detectors are inaccurate, and include mechanical parts subject to attrition over time.

In a third leak detection technique, changes in the volume of a sample quantity of liquid included within the tank are monitored. This volumetric method is somewhat more accurate than the techniques described above, and may be employed to discern leak rates of approximately 0.05 gallons/hour. Unfortunately, this technique is expensive and can take up to six hours to perform. These drawbacks make the volumetric method impractical for daily testing which, in the context of toxic liquid storage, may be imperative.

Hence, a need in the art exists for an inexpensive, leak detector free of moving mechanical parts which allows precision measurements to be conducted in a relatively short time interval.

SUMMARY OF THE INVENTION

The need in the art for a precision, inexpensive liquid leak detector free of mechanical moving parts is addressed by the liquid leak detector of the present invention. The inventive leak detector is disposed to measure the rate of change of the volume of a liquid within a container. The leak detector includes a light guide which is disposed within the container and at least partially immersed in the liquid. The light guide is constructed so that evanescent wave loss occurs as a result of immersion of the guide within the liquid. The light guide is positioned in optical alignment with a light source, which injects optical energy therein. The leak detector further includes an arrangement for measuring any decrease in the intensity of the injected optical energy occurring over a length of the fiber immersed in the liquid. The measuring arrangement generates an intensity loss signal indicative of any intensity decrease. The inventive leak detector also includes a network for measuring the rate of change of the intensity loss signal and for calculating the rate of change of the liquid volume on the basis of the rate of change in the intensity loss signal.

DESCRIPTION OF THE INVENTION

The liquid leak detector of the present invention is operative to measure the time rate of change of the volume of liquid held by a container of known dimensions. The inventive leak detector monitors the time rate of change of the level of the liquid within the tank via an light guide, which enables calculation of the leak rate. In the preferred embodiment, the light guide is implemented with an optical fiber. The present invention exploits the occurrence of evanescent wave loss due to immersion of the fiber in the contained liquid. Such losses of optical energy take place only when the fiber is submerged in the liquid, and are substantially nonexistent when the fiber is in contact with air. Accordingly, by disposing an optical fiber in the container holding the liquid and by measuring the time rate of change of the intensity of light which traverses the optical fiber, the time rate of change of the liquid level within the tank is ascertained. By monitoring the change in liquid level the corresponding change in the volume of liquid held by the container may be determined.

Principle of Evanescent Wave Operation

Figure 1:
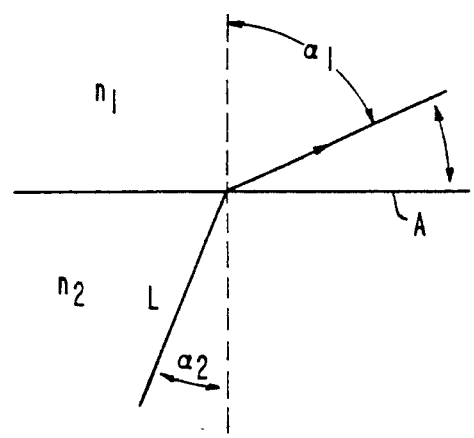
FIG. 1 is an illustrative representation of a light beam L incident on the interface A of first and second dielectrics having respective indexes of refraction $n_1$, $n_2$.

As shown in the illustrative representation of FIG. 1, at the interface A of first and second dielectrics having respective indexes of refraction $n_1$, $n_2$, a portion of the light L incident at an angle $\alpha_2$ with respect to the vertical is refracted at an angle $\alpha_1$ with respect to the vertical. By Snell's Law the angles $\alpha_1$ and $\alpha_2$, and the indexes of refraction satisfy the relationship:

$$\sin \alpha_2 / \sin \alpha_1 = n_1/n_2 \qquad [1]$$

When the light L propagates from the second to the first dielectric medium under the condition of $n_2 > n_1$, there is a maximum angle $\alpha_2$ for which $\alpha_1$ becomes equal to 90 degrees. This is known as the angle of total internal reflection. Under this circumstance all of the light L is reflected back into the second medium ($n_2$). Nonetheless, in a thin layer of the first dielectric immediately adjacent to the interface A there exists an exponentially decreasing intensity of light propagating parallel thereto. As is well known, the optical energy propagating within this thin layer is termed the evanescent wave.

Figure 2:
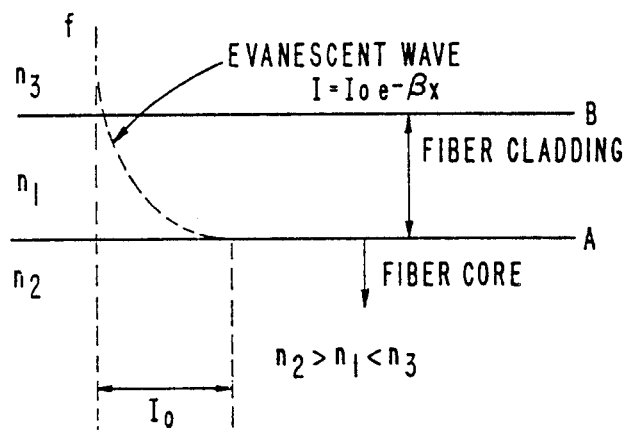
FIG. 2 is a diagrammatic representation of the light intensity distribution within the portions of the first and second dielectrics surrounding the interface A.

FIG. 2 is a diagrammatic representation of the light intensity distribution within the portions of the first and second dielectrics surrounding the interface A. The intensity of the evanescent wave within first dielectric of refractive index $n_1$ is given (as a function of the distance x from the interface A) by:

$$I = I_0 e^{-\beta x} \quad [2]$$

where the attenuation coefficient $\beta$ is (for a small glancing angle of $90 - \alpha_2$ degrees):

$$\begin{aligned}\beta &= 2\pi (n_2^2 - n_1^2)^{\frac{1}{2}}/\lambda \\ &= (2\pi/\lambda)(2n\Delta n)^{\frac{1}{2}}\end{aligned} \quad [3]$$

Here $\lambda$ is the wavelength of light and $\Delta n = n_2 - n_1$ ($n \approx n_1 \approx n_2$). Assuming an evanescent wave intensity of unity at the interface A, the reciprocal of $\beta$, is generally known as the penetration depth and is equivalent to the distance from the interface A at which the value of the evanescent wave falls to 1/e.

Under the condition of $n_2 > n_1$ the first and second dielectrics may be viewed as representing the cladding and fiber core of a conventional optical fiber. As shown in FIG. 2 the cladding extends from an outer surface B thereof to the interface A between the cladding and fiber core. If a liquid with an index of refraction larger than that of the cladding ($n_1$) is placed at the surface B, a portion of the optical energy carried by the optical fiber (the "tail" of the exponential decay) propagates into the liquid. In order to exploit this loss of optical energy in the context of a liquid leak detector the separation between the surface B and the interface A (the fiber cladding thickness) must generally be on the order of the penetration depth. For commercially available optical fibers the penetration depth is typically approximately 5 μm. In this way a substantial portion of the optical energy initially launched on the fiber will be lost during propagation thereof through the segment of the fiber immersed in the liquid.

The Preferred Embodiments

Figure 3:
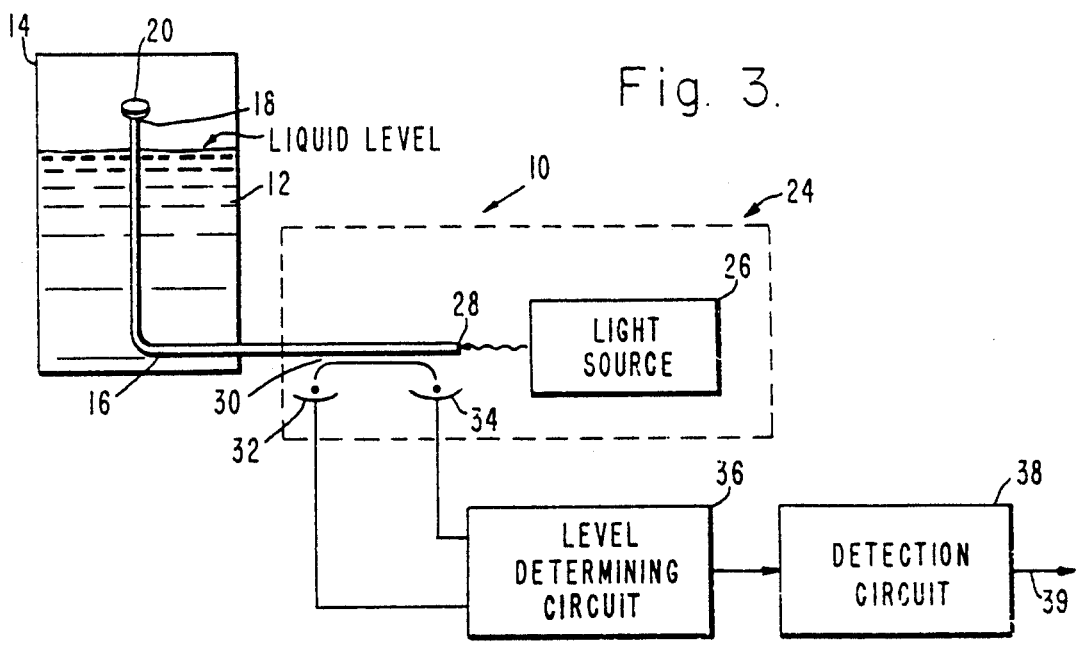
FIG. 3 is a partially illustrative, partially block diagrammatic representation of the leak detector of the present invention.

FIG. 3 is a partially illustrative, partially block diagrammatic representation of the leak detector 10 of the present invention. The detector 10 is disposed to determine the rate of change of the volume of liquid 12 contained within a tank 14. An optical fiber 16 is mounted within the tank 14 such that a first fiber end 18 is supported at an upper level within the tank 14 as high as the highest anticipated liquid level. The fiber 16 may, for example, be supported within the tank 14 by gluing it to the inner surface of the tank. A fiber end reflector 20 is disposed at the first fiber end 18. It is well known that optical energy from the fiber 16 incident on the reflector 20 is reflected back into the fiber 16.

The fiber 16 extends past a lower level within the tank 14 which is at least as low as the anticipated lowest liquid level. The optical fiber 16 extends from the tank 14 to a coupling network 24. Briefly, the coupling network 24 is operative to inject an optical beam into the fiber 16 which is reflected back to the network 24 by the reflector 20. The network 24 then recovers that portion of the injected beam not lost to the liquid during traversal of the fiber 16.

The network 24 includes a light source 26, such as a semiconductor laser, which is employed to inject light into a second fiber end 28. A fiber optic beamsplitter 30 is utilized in conjunction with first and second photodetectors 32 and 34. The beamsplitter 30 is disposed to split off a portion of the light energy injected into the second fiber end 28 by the light source 26 and direct it to the first photodetector 32. In addition, the beamsplitter 30 functions to direct a portion of the optical energy which has been reflected by the reflector 20, and therefore has twice traversed the fiber 16, to the second photodetector 34. Electrical outputs from the photodetectors 32 and 34 are fed to a level determining circuit 36. The level determining circuit 36 would include a processor and/or a lookup table or other suitable circuit as may be utilized by one skilled in the art. The level determining circuit 36 is calibrated to the particular size and shape of the tank 14 and to the inherent optical loss of the fiber 16 such that a given ratio in the intensity of the light received by the photodetectors 32 and 34 is known to correspond to a particular level of liquid within the tank 14.

It is noted that this method of ascertaining the amount of optical energy lost to the liquid is independent of the intensity of the source 26 and of the coupling efficiency of light from the source 26 into the fiber 16. Accordingly, the ratio of the photodetector outputs is a uniquely defined function of the liquid level—since evanescent loss occurs only in the segment of the fiber 16 immersed in the liquid.

Fiber beamsplitters suitable for use as the beamsplitter 30 are commercially available; for example, the model F560B beamsplitter marketed by Newport Research Corporation, 18325 Mt. Baldy Circle, Fountain Valley, Calif. 92728-8020, is suitable for the purpose.

Photodetectors suitable for use as photodetectors 32, 34 are commercially available; for example, the model C30808 photodetector device marketed by RCA, 773 Donegal Business Center, P.O. Box 540, Mt. Joy, Pa. 17552, is suitable for the purpose.

An optical fiber suitable for use in this device is shown in a copending patent application titled Eccentric Core Fiber by V. Vali, filed Apr. 20, 1990, Ser. No. 07/511,619 and assigned to Hughes Aircraft Company.

The laser light source 26 may comprise a semiconductor laser such as the model LB1-02 laser marketed by Stantel Components, Inc., 636 Remington Road, Schaumberg, Ill. 60173. Alternatively, other light sources may be used, such as an incandescent light bulb or LED.

In reference once again to FIG. 3, the output of the level determining circuit 36, indicative of the level of the liquid within the tank 14, is monitored by a detection circuit 38. The detection circuit 38 is designed to calculate the time rate of change of the volume (leak rate) of liquid within the tank 14. The detection circuit 38 is then operative to impress an analog or digital signal indicative of the leak rate on an output signal line 39. The leak rate may be calculated by observing that the change in the intensity (dI) of a beam traversing a length (dL) of optical fiber immersed in a liquid may be expressed as:

$$dI = I^*G\&dL \tag{4}$$

where I is the beam intensity (photons/second), G is the attenuation coefficient and * denotes multiplication. The attenuation coefficient G for commercially available fibers (assuming a half-intensity length of approximately 100 cm) is on the order of $7 \times 10^{-3}$ cm$^{-1}$. The intensity I of the beam as a function of the length L of liquid-immersed fiber traversed thereby is:

$$I = I_o e^{-G^*L} \tag{5}$$

where $I_o$ is the initial beam intensity. By differentiating equation [5] the incremental change of light intensity with respect to the length traversed is given by:

$$dI/dL = -G^*I_o{}^*e^{-G^*L}. \tag{6}$$

From equation [6] the time rate of change of beam intensity may be expressed as:

$$dI/dt = -G^*I_o{}^*e^{-G^*L}{}^*dL/dt \tag{7}$$

where dL/dt corresponds to the rate of change of the liquid level within the tank. It is observed that the quantity dL/dt may be determined by monitoring the output of the level determining circuit 36 as a function of time.

For simplicity of explanation it will be assumed that the tank 14 is rectangular in shape and holds a volume of liquid $V = x^*y^*L'$, wherein x is the tank width, y is the tank length, and L' is the height of liquid stored in the tank 14. Elementary differentiation then yields:

$$dV/dt = x^*y^*dL'/dt \tag{8}$$

or $$dL'/dt = [1/(x^*y)]^*dV/dt. \tag{9}$$

If the optical fiber segment of length L immersed in the liquid extends vertically through the entire volume of liquid having height L', then L = L'. Under the condition of L = L' equations [7] and [9] may be combined to give:

$$dI/dt = -G^*I_o{}^*e^{-G^*L}{}^*(1/x^*y)^*dV/dt. \tag{10}$$

Rearranging equation [10] the time rate of change of liquid held by the tank 14 (leak rate) may be expressed as:

$$dV/dt = -dI/dt^*(x^*y/G^*I_o)^*e^{G^*L} \tag{11}$$

It follows that the detection circuit 38 may include a microprocessor designed (or programmed) to calculate the leak rate dV/dt on the basis of equation [11] and the quantity dI/dt. Again, dI/dt may be determined by monitoring the output of the level determining circuit 36 (which corresponds to dL/dt) and using equation [7]. In order to record the value of the output from the circuit 36 as a function of time the detection circuit 38 may include a digital memory module and internal clock or timing circuit. Alternatively, the output of the level detection circuit 36 may drive a chart recorder—from which the quantity dL/dt may be manually determined.

In certain underground storage applications a tank may leak in reverse. That is, the tank may accept water through the bottom thereof. Conventional methods of reverse leak detection include the technique of probing the bottom of the tank with a coated dip stick. The dip stick is covered with a chemical paste which changes color in the presence of water. An alternative embodiment of the leak detector of the present invention may be adapted to obviate the need for such manual testing. This is accomplished by choosing the index of refraction of the fiber optic cladding such that evanescent wave loss occurs in the presence of the liquid intended to be held by the tank, having an index of refraction $n_3$, but does not occur in the presence of the contaminating liquid, e.g., water, having an index of refraction $n_4$. The index of refraction of the core $n_2$ is then chosen to be slightly larger than that $n_1$ of the cladding. Also, the index of the cladding $n_1$ should be greater than that $n_4$ of the contaminating liquid and less than that $n_3$ of the liquid stored in the tank. Hence, more than a single optical fiber may be disposed within a particular tank in order to simultaneously monitor potential leakage of a first liquid from the tank and reverse leakage of a second liquid into the tank. In some instances it may be desired to couple each optical fiber to separate level determining and detection circuits. Alternatively, in light of the teachings disclosed herein those skilled in the art may modify the level and detection circuits to be responsive to photodetector output signals from more than one fiber.

Sensitivity

As mentioned in the Background of the Invention, the more precise conventional leak detectors generally can discern a minimum leak rate of approximately 0.05 gallons/hour. As shown in the example below, the leak detector of the present invention may detect leaks of substantially smaller magnitude.

Using the typical values of G = 1 cm$^{-1}$ and $I_o = 10^{16}$ photons (equivalent to a 3 mW laser for 1 second), equation [6] yields a value for dI/dL of approximately $3 \times 10^{13}$ photons/cm. Assuming traversal of the equivalent of approximately 3.3330 cm of immersed optical fiber it follows that on the order of $10^{12}$ photons will reach the photodetector 34. However, the Poisson noise level accompanying the $10^{12}$ photons reaching the photodetector 34 is equivalent to the square root of $10^{12}$, or $10^6$ photons. Accordingly, using $10^6$ for the value of dI in equation [4] results in a minimum detectable liquid level change of $10^{-6}$ cm., or 1 $\mu$m. Assuming a liquid surface area of $x^*y = 10^4$ cm$^2$ the minimum discernible volume change is $10^{4*}10^{-6} = 10^{-2}$ cm$^3$. Recalling that a 3 mW laser was employed for 1 second (corresponding to a 1 second measurement time), the minimum detectable leak rate is equivalent to $10^{-2}$ cm$^3$/second = 36 cm$^3$/hr., or approximately 0.01 gallons/hr. It follows that the leak detector of the present invention may display up to five times more accuracy than conventional precision leak detectors.

Accuracy Enhancement

If the liquid held by the tank 14 leaves a residue on the fiber 16 (see FIG. 3), the measured loss of light will not be a unique measure of the liquid level nor of the leak rate. In applications where the potential leak rate of a tank including a liquid such as gasoline is to be monitored, a thin coating (e.g. a few microns) of fluorinated ethylene polypropylene or tetrafluoroethylene, such as that marketed by DuPont under the registered trademark "Teflon," applied to the optical fiber may prevent the formation of residue on the fiber. Such a thin coating could be applied, for example, by sputtering techniques. However, if the formation of residue is a problem for a particular application, the fiber can be surrounded by a flexible sleeve or membrane that contains a clean liquid, the surface height of which will then correspond to (or be proportional to) the surface height of the fuel or other liquid outside the sleeve. By measuring the rate of change of the level of the clean liquid the leak rate may then be ascertained. The clean liquid should be selected such that its surface tension does not wet the optical fiber.

Figure 4:
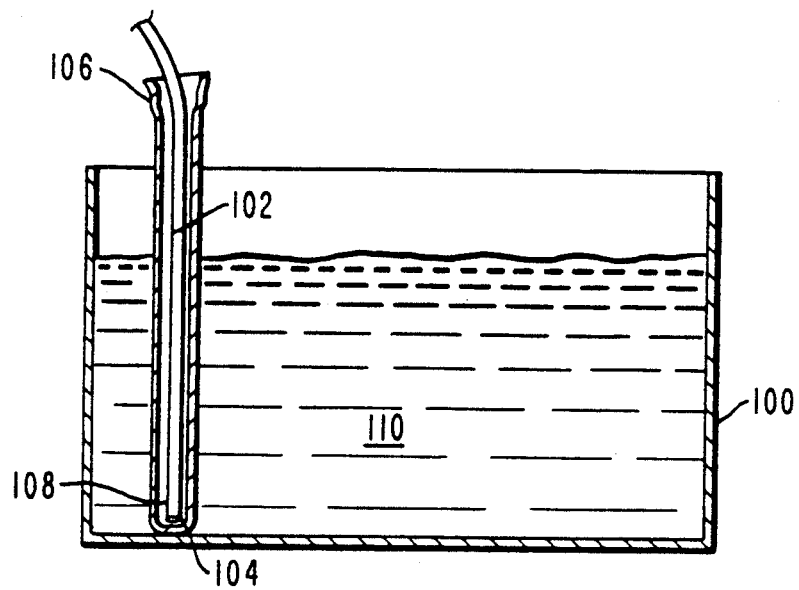
FIG. 4 is a side cross sectional view of a tank, within which is disposed an optical fiber surrounded by a flexible membrane.

FIG. 4 is a side cross sectional view of a tank 100, within which is disposed an optical fiber 102 surrounded by a flexible membrane 106. The fiber 102 is employed within a leak detector 10 of the present invention, the remainder of which is not shown in FIG. 4. The tank 100 holds a liquid 110 with the optical fiber 102 entering from the top of the tank 100. The fiber 102 extends downward through the liquid 110 and is terminated by a fiber end reflector 104 adjacent to the bottom of the tank 100. A clean liquid 108 occupies the space between the inner surface of the membrane 106 and the external surface of the optical fiber 102. If the fiber cladding includes a coat of "Teflon", for example, a liquid appropriate for use as the clean liquid 108 is glycerin. The membrane 106 may constitute, for example, a fluoroelastomer such as that sold under the registered trademark "Viton" by DuPont Automotive Products, 950 Stephenson Highway, P.O. Box 7013, Troy, Mich. 48007, having a thickness of about 0.001 inch.

The height $H_1$ of the liquid 110 is related to the height $H_2$ of the clear liquid 108 within the membrane 106 by the ratios of the respective densities of the two liquids. The force or pressure exerted by the liquid 110 against the flexible membrane 106 will be balanced by the force exerted by the clear liquid 108 against the membrane 106. Thus $H_1 D_1 = H_2 D_2$, where $D_1$ and $D_2$ are the respective densities of the liquids 110 and 108. The height $H_2$ is proportional to $H_1$, $D_1$ and $D_2$. It is not necessary that the membrane 106 be flexible throughout its length. For example, only a relatively short segment of the membrane 106 adjacent to the bottom of the tank 110 need be flexible; the remainder of the membrane 106 could be fashioned from a rigid tube. It follows that the rate of change of the level of the clean liquid 108 (measured directly by the inventive leak detector) may be utilized to calculate the leak rate of the liquid 110 by appropriately substituting into equation [7].

Figure 5:
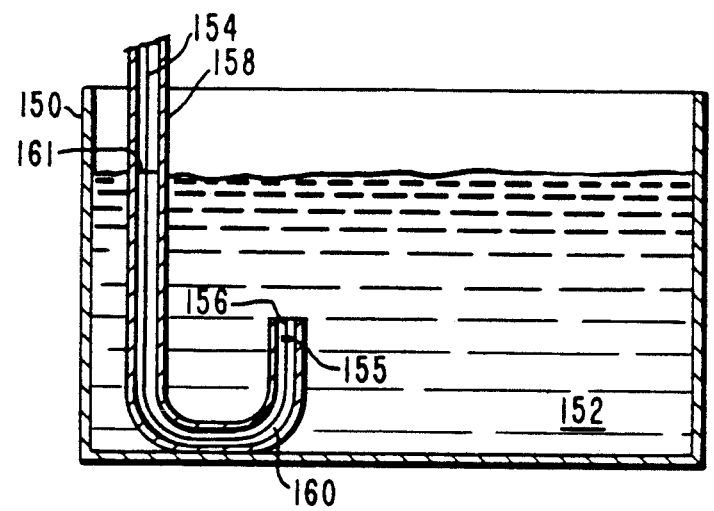
FIG. 5 is a side cross sectional view of a tank holding a liquid—the volume of which is to be monitored by an embodiment of the present invention incorporating a rigid "J" shaped membrane disposed about an optical fiber.

FIG. 5 illustrates a second technique which may be used to accurately measure the leak rate of a liquid tending to leave a residue on the optical fiber. FIG. 5 is a side cross sectional view of a tank 150 holding a liquid 152—the volume of which is to be monitored by the leak detector 10 of the present invention. An optical fiber 154 disposed within a rigid "J" shaped tube 158, open at either end, extends into the tank 150. Disposed within the tube 158 is a clean liquid (e.g. metholyne iodide or mercury) of a higher density than the liquid 152. A fiber end 155 is terminated with a fiber reflector 156.

The level 161 of the liquid 160 within the tube 158 will respond to pressure from the liquid 152 at the interface of the liquids 152, 160 such that the liquid level 161 will be proportional (although not necessarily equal) to the level of the liquid 152 within the tank 150. The output from the level determining circuit (not shown in FIG. 5) can be calibrated so as to provide appropriately adjusted level indicating signals to the leak detection circuit (not shown in FIG. 5). The calibrated level indicating signals are then used by the leak detection circuit to gauge the leak rate of the liquid 152 from the tank 150. To restrict undesired flow of the liquid 160 due to movement of the tank 150, e.g. when mounted within an automobile, a capillary or narrow channel (not shown) may be formed in the tube 158 close to the interface of the liquid 152 and the liquid 160. It will also be appreciated that it is not necessary to use a "J" shaped tube; other arrangements may employ a straight tube or other tube configurations.

Figure 6:
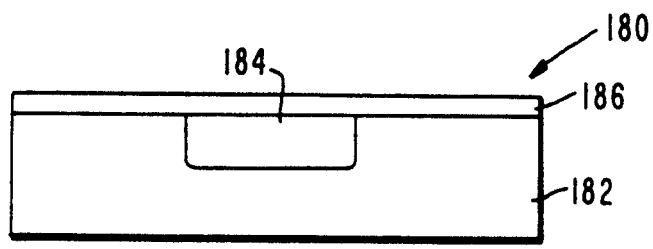
FIG. 6 is an alternative implementation of the light guide of the present invention.

Thus the present invention has been described with reference to a particular embodiment in connection with a particular application. Those having ordinary skill in the art and access to the teachings of the present invention will recognize additional modifications and applications within the scope thereof. For example, the invention is not limited to use of an optical fiber as a light guide. Any device that takes advantage of evanescent wave loss can serve as the light guide. For example, the sectional end view of FIG. 6, shows a semiconductor light guide having a substrate 182, a doped portion serving as an optical waveguide 184 and a thin cladding 186. When the light guide 180 is used in place of the optical fiber 16 of FIG. 1, evanescent wave loss will occur between the surface between the cladding 186 and the liquid 12 which may be detected and utilized in the manner described above.

Further, in certain applications it may be desired to further increase the precision of the inventive leak detector by arranging the optical fiber to pass through the volume of liquid under observation several times. Such modifications of the length of fiber immersed in the liquid may be effected through recalibration of the inventive leak detector without departing from the scope of the present invention.

In addition, those skilled in the art may be aware of techniques for coupling several optical fibers to a single level determining circuit. This concatenation of various embodiments of the present invention also would not depart from the scope thereof. It is therefore contemplated by the appended claims to cover any and all such modifications, applications and embodiments within the scope of the present teachings.

Accordingly,

What is claimed is:

1. A liquid leak detector for measuring the rate of change of the volume of a first liquid within a container, comprising:

an optical fiber having a first end and a second end, said fiber being disposed within said container and at least partially immersed in said liquid wherein said fiber includes a fiber core circumscribed by a fiber cladding selected such that evanescent wave loss occurs as a result of immersion of said cladding in said liquid;

a fiber end reflector attached to said first end of said optical fiber;

light source means for injecting light into said second end of said optical fiber;

beamsplitter means for coupling off a first portion of said injected light and for coupling off a second portion of the light which has traversed said fiber and been reflected by said reflector; and comparator means for comparing the intensity of said first portion of light with the rate of change of the intensity of said second portion of light and for determining the rate of change of the volume of said first liquid in response thereto.

2. The leak detector of claim 1 further including a first photodetector responsive to the intensity of said first portion of light to provide an input intensity signal and a second photodetector responsive to the intensity of said second portion of light to provide an output intensity signal, wherein said comparator means is responsive to said input intensity signal and said output intensity signal.

3. A liquid leak detector for detecting the presence of a contaminating liquid of refractive index $n_4$ in a container disposed to hold a first liquid of refractive index $n_3$ therein, comprising:

an optical fiber disposed within said container and at least partially immersed in said first liquid, said fiber including a fiber core of refractive index $n_2$ circumscribed by a fiber cladding of refractive index $n_1$ selected such that evanescent wave loss occurs as a result of immersion of said cladding in said liquid, wherein $n_2 > n_1$, $n_1 < n_3$ and $n_1 > n_4$;

light source means for injecting optical energy into said optical fiber;

means for measuring any decrease in the intensity of said injected optical energy over a length of said fiber due to said evanescent wave loss, said measuring means including means for providing an intensity loss signal indicative of said intensity decrease; and leak detector means for generating a detection signal indicative of the presence of said contaminating liquid within said container in response to changes in the magnitude of said intensity loss signal.

* * * * *